US006832201B1

(12) United States Patent
Leymann et al.

(10) Patent No.: US 6,832,201 B1
(45) Date of Patent: Dec. 14, 2004

(54) METHOD AND SYSTEM FOR OPTIMIZING REQUEST SHIPPING IN WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,606

(22) Filed: Nov. 19, 1999

(30) Foreign Application Priority Data

Nov. 20, 1998  (EP) ............................................ 98122016

(51) Int. Cl.[7] .............................................. G06F 17/60

(52) U.S. Cl. ........................................................ 705/7

(58) Field of Search ......................................... 705/7, 8

(56) References Cited

U.S. PATENT DOCUMENTS

| | | | | |
|---|---|---|---|---|
| 5,168,444 A | * | 12/1992 | Cukor et al. .................... | 705/1 |
| 5,581,691 A | * | 12/1996 | Hsu et al. ....................... | 714/15 |
| 5,621,790 A | * | 4/1997 | Grossman et al. ........... | 379/266 |
| 5,638,519 A | * | 6/1997 | Haluska ......................... | 705/28 |
| 5,721,913 A | * | 2/1998 | Ackroff et al. .............. | 707/103 |
| 5,826,239 A | * | 10/1998 | Du et al. ........................ | 705/8 |
| 5,870,545 A | * | 2/1999 | Davis et al. ................. | 709/201 |
| 5,890,133 A | * | 3/1999 | Ernst .............................. | 705/7 |
| 5,963,911 A | * | 10/1999 | Walker et al. ................. | 705/7 |
| 6,065,009 A | * | 5/2000 | Leymann et al. ............. | 707/10 |
| 6,125,352 A | * | 9/2000 | Franklin et al. .............. | 705/26 |
| 6,167,395 A | * | 12/2000 | Beck et al. ..................... | 707/3 |
| 6,341,266 B1 | * | 1/2002 | Braun ............................ | 705/7 |
| 6,349,238 B1 | * | 2/2002 | Gabbita et al. ............. | 700/101 |
| 6,567,783 B1 | * | 5/2003 | Notani et al. .................. | 705/9 |
| 6,578,006 B1 | * | 6/2003 | Saito et al. ..................... | 705/9 |

FOREIGN PATENT DOCUMENTS

| | | | | |
|---|---|---|---|---|
| GB | 2319367 A | * | 5/1998 | ........... G06F/17/60 |
| JP | 10320490 A | * | 12/1998 | ........... G06F/19/00 |

OTHER PUBLICATIONS

Sayles, Leonard R Stewart, Alex. Spring 1995, Belated recognition for work flow entrepreneurs: A case of selective perception and amnesia in management thought Entrepreneurship. Theory & Practice, v19n3, pp. 7–23.*

"Project Management Environment", by D.J. Spohn, IBM Technical Disclosure Bulletin, vol. 32, No. 9 A, Feb. 1999, pp. 250–254.

(List continued on next page.)

Primary Examiner—Tariq R. Hafiz
Assistant Examiner—Andre Boyce
(74) Attorney, Agent, or Firm—Scully, Scott, Murphy & Presser; Rafael Perez-Pineiro, Esq.

(57) ABSTRACT

A method for optimizing request shipping within a plurality of distributed networked computer systems holding a distributed application the usage of which realizes a process model underlying said application is proposed in which said process model comprises a business process consisting of a plurality of activities to be performed on said application systems by a plurality of users, including shipping of activity requests between a local application system owning said business process and a plurality of remote application systems performing said activities with the help of a plurality of users.

The basic idea is to optimize the assignment of the users to the appropriate application system in such a way that the number of remote work item requests is optimized. The inventional method can be advantageously applied to workflow management systems. The optimization process involved comprises applying a so-called 'optimization function' reflecting the overall costs for request shipping and additional costs for performing the business process.

6 Claims, 5 Drawing Sheets

OTHER PUBLICATIONS

"Object–Oriented Workflow for Mission–critical Applications", by Ronni T. Marshak, IBM's FlowMark, Workgroup Computing Report, vol. 17, No. 5, pp. 1–13.

"Workflow Management Based on an Object–Oriented Paradigm", by H.A. Inniss, et al., IBM Technical Disclosure Bulletin, vol. 37, No. 3, Mar. 1994, p. 185.

"Business Process Management With FlowMark", by Frank Leymann, et al., 1994, IEEE, pp. 230–234.

"A Meta Model to Support Modelling and Execution of Processes", by Frank leymann, pp. 287–294.

"IBM Introducing FlowMark of OS/2 Model efficiency into your business", IBM Software Solutions, Mar. 1994, pp. 1–4.

"Managing business process as an information resource", by Frank Leymann, et al., IBM Systems Journal, vol. 33, No. 2, 1994, pp. 326–348.

"Veriifikation von WorkFlows in IBM FlowMark", by Dieter Roller, pp. 353–368.

* cited by examiner

US 6,832,201 B1

METHOD AND SYSTEM FOR OPTIMIZING REQUEST SHIPPING IN WORKFLOW MANAGEMENT SYSTEMS

BACKGROUND OF THE INVENTION

1. Technical Field

The present invention relates to improvement of request shipping in distributed applications, particularly in workflow management systems, further referred to as WFMSs that are operating in a distributed environment in a networked computer system. In particular, the present invention relates to method and system for optimizing request shipping in such systems.

2. Prior Art

Although the subject matter of the invention is applicable to a broad variety of applications, i.e. whenever an application is able to be described with the basic structure and terminology of WFMSs, the present invention will be disclosed herein applied to WFMSs by way of example.

A new area of technology with increasing importance is the domain of WFMSs. WFMSs as for example implemented by IBM FlowMark support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or WFMS.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described. In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful WFMS. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Beckerund G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A user typically interacts with the WFMS via a graphical end user interface that represents the tasks to be performed by the user as icons. Work for a particular task is started by the user by double-clicking on the appropriate icon which in turn starts the program implementing the activity.

Said activities are generally steps within a particular business process. Each activity represents a piece of work which the assigned person can complete by starting a program or another process.

The activities to be performed have typically a fine structure:

An Activation Condition defines when the activity is ready for scheduling by the workflow manager; an Exit Condition defines when an activity should be treated as complete by the workflow manager. The core of the activity is the Task which is comprised of the proper activity and a query on an organization database. The Proper Activity associates the activity with a program object. The program object defines for each operating system, and possibly for each user, the name and operational characteristics for an executable piece of software. The executable piece of software is started when the activity is performed by a user. The query on the organization database defines the persons responsible for performing the activity. When the activity is ready to be scheduled, the workflow management executes the specified query against the organization-database. This query returns a set of persons, to which the activity is assigned to. The task is transformed into a set of work items, one for each person selected as the result of the query against the organization database. The work item contains the name of the person and the program to be executed. These work items are made part of the users' worklist.

Each of the activities is performed by an activity implementation. The activity implementations are typically programs, but they may also be the invocation of a method object or a stored procedure in a relational data base. This will be described later with reference to FIG. 2. The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

A business process model also encompasses the description of the flow of the activities itself between "resources" actually performing the pieces of work represented by each activity. A resource may be specified as a particular program" person, a role, or an organizational unit. At run time tasks are resolved into requests to particular persons to perform particular activities resulting in work items for that person. Staff assignments are the means to distribute activities to the right people in the sequence prescribed by the control flow aspect of a business process model. The way how staff is assigned will be described in more detail later in chapter 4.1. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

A base assumption of such prior art systems is that one specific WFMS is the owner of the workflow. For other workflows a different WFMS can be the workflow owner. The owner WFMS starts and controls the execution of the appropriate workflow. This WFMS is called the 'local' WFMS as this is the usual place for the workflow to execute.

A further base assumption is that a user is always assigned to only one WFMS for which the user is identified, for example, by his/her user ID.

If a user is selected for a certain activity and said user is assigned to another WFMS appropriate information must be shipped to said other WFMS to be able to handle that activity. This shipping of information is referred to in the following as 'request shipping'. For obvious reasons, said other WFMS is called a 'remote' WFMS.

If only one user is selected, a respective work request including associated activity data can be shipped immediately to said other WFMS. Said activity data comprises the input container, the output container partly filled with default values, the staff specific data and the activity specific data.

In particular, the actions which are taken by the local WFMS when a user is selected who is assigned to a remote WFMS are summarized as follows:

First, staff resolution is performed which is described in more detail later in the introductory chapter 4.1. For simplicity, it is assumed that precisely one user is selected for working on the activity. If the only selected user is not part of the local WFMS the appropriate workflow system is determined. Next, a request is sent to the remote WFMS including said activity data. Then it is waited for response. When the response is obtained the local WFMS takes appropriate actions such as storing the output container in the database, storing the audit trail information and continuing navigation.

The remote WFMS takes the following actions:

It receives the request from the local WFMS. Then, said activity data is saved in a database. Next, a work item is created for the specified user and is put on this user's worklist.

Then, the system has to wait until the user selects his work item. The containers must be retrieved from the data base and the activity implementation has to be invoked. Then the audit trail records are created, container requests are honored and the system has to wait until the activity implementation is completed.

Next, the container and the audit trail are sent back to the local WFMS and any residue is cleaned up.

A much more complex processing is required, when users of more than one WFMS are selected during staff resolution. In this case, it must be ensured that one and only one user executes the activity. This requires that the involved WFMS exchange further information beside the simple request shipping. As in the simple case, the local WFMS orchestrates all interactions between the affected WFMSs.

The following steps are executed in this case. For simplicity it is assumed that no user from the local WFMS has been selected.

The local WFMS sends a work item request to all remote WFMSs that host at least one selected user. The work item request contains a list of all users that are associated with the targeted WFMS, plus information that allows the remote WFMSs to create work items for the selected users. The remote WFMSs create work items for each user and insert those work items into the appropriate work lists of the users. As this is done by a remote WFMS those work items are considered as remote work items by the local WFMS.

When a user selects a work item, the appropriate WFMS first removes it from the worklist of all other users that are associated with the same WFMS and then informs the local WFMS that the work item has been selected.

The local WFMS determines the remote WFMS on which the activity was first selected and sends a 'request for execution' to the selected remote WFMS. This request contains all activity related information.

The local WFMS broadcasts to the other remote WFMSs that their requests are no longer honored. The non-selected WFMSs delete the work items from the respective worklists. In the case a user has already selected his work item, the user is informed that somebody else has selected the work item.

After the work item was finished by the selected user, the remote WFMS ships back the output container and the audit trail information.

The local WFMS stores the output container in it's database, stores the audit trail information and continues navigation.

The problem underlying to the present invention thus consists in the large number of 'distributed' or 'remote' work items, because it is obvious from the previous description that management of distributed work items, i.e. shipping of work requests between different WFMSs is expensive. The costs associated with this type of processing are proportional to the number of WFMSs that need to be involved in the processing of an activity.

It is therefore the general object of the present invention to provide a method and system for optimizing request shipping in distributed applications and particularly in workflow management systems.

SUMMARY OF THE INVENTION

The present invention is directed to a method for optimizing request shipping within a plurality of distributed networked computer systems holding a distributed networked computer systems holding a distributed application the usage of which realizes a process model underlying said application is proposed in which said process model comprises a business process consisting of a plurality of activities to be performed on said application systems by a plurality of users, including shipping of activity requests between a local application system owning said business process and a plurality of remote application systems performing said activities with the help of a plurality of users.

The basic idea is to optimize the assignment of the users to the appropriate application system by re-assigning users to a different WFMS in such a way that the number of remote work item requests is optimized. The inventional method can be advantageously applied to workflow management systems (WFMSs). The optimization process involved comprises applying a so-called 'optimization function' reflecting the overall costs for request shipping and additional costs for performing the business process.

Hereby, an essential parameter is the number of involved application systems, particularly of WFMSs, because they are the receivers of the 'expensive' work item requests shipped in the overall system. The second essential parameter is the number of work item requests shipped in the system.

Amongst others, further additional constraints influencing the costs are hardware costs, available bandwidth on data links between particular application systems, or WFMSs respectively, maintenance costs, and individual product quality costs specific for each business process and enterprise.

Thus, overall costs including all above mentioned parameters should be minimized by the inventional method within reasonable limits determined by the enterprise's management.

For performing said optimization function an optimization data gathering step is required. In this step a plurality of facts are collected some facts being statistical data and some non-statistical data.

Then the individual optimization data are weighted and the overall optimization function can thus be established or an already existing function can be selected and applied, respectively. As a result of the optimization, users are possibly re-assigned to a different application system, particularly to a different WFMS. Thus, the number of work item requests will be reduced with the re-assignment.

The method of the present invention with the characteristics of claim 1 has the advantage, in relation to the method sketched out in the discussion of prior art technique that request shipping is lowered and thus the costs associated with performing the business process are lowered.

In a preferred embodiment of the inventional method the data gathering step comprises extracting the optimization data from the audit trail of the local WFMS.

In a preferred embodiment of the inventional method the number of WFMS is reduced by combining several WFMSs. Thus, request shipping and costs can be further reduced.

BRIEF DESCRIPTION OF THE DRAWINGS

The preferred embodiments of the present invention will now be described, by way of example only, with reference to the accompanying drawings in which.

DETAILED DESCRIPTION OF THE PREFERRED EMBODIMENTS OF THE INVENTION

Figure 1:
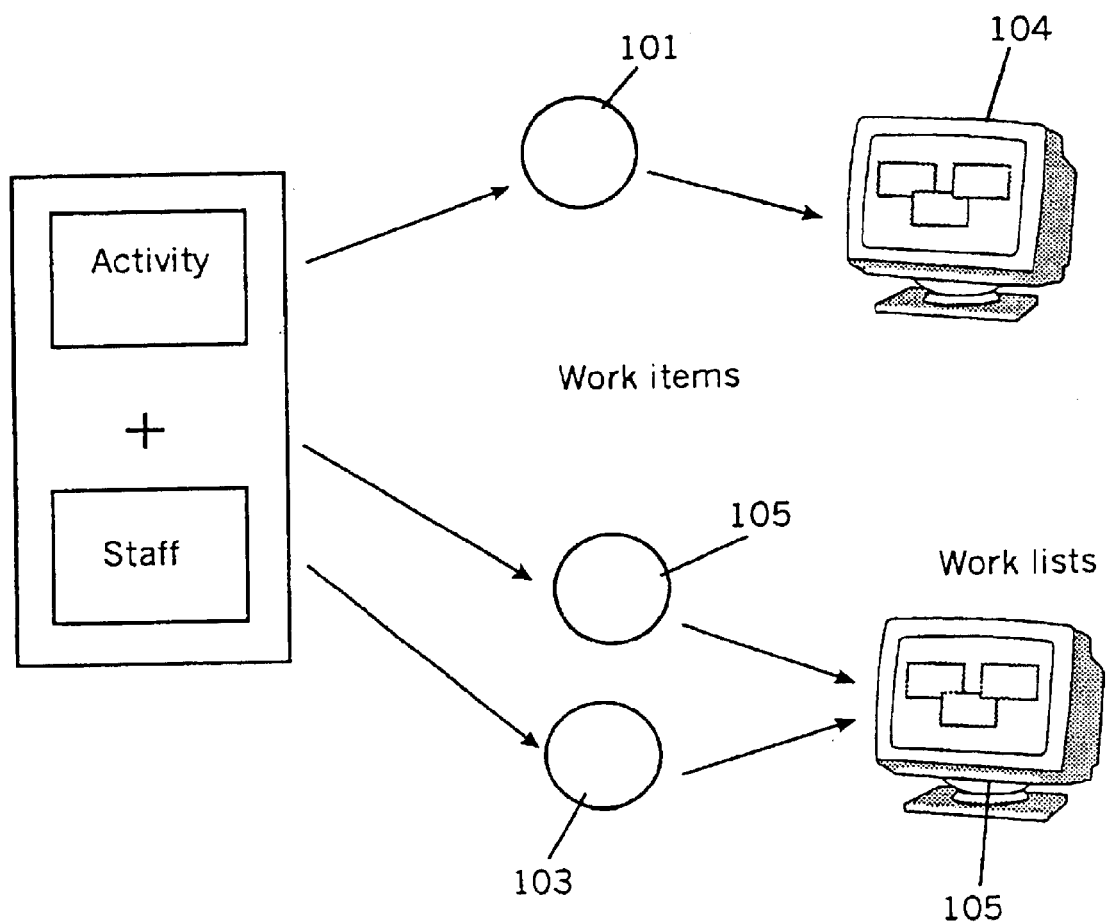
FIG. 1 is an introductory diagram reflecting the first phase of the execution of an activity in a WFMS showing the creation of work items according to prior art technique.

The following is a short outline on the basic concepts of a workflow management system based on IBM's FlowMark WFMS and leading directly to the inventive concept:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
Programs
staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next
Which persons are to perform activities and what programs they are to use
Whether any other processes, called subprocesses, are nested in the process Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start
Whether the activity must be started manually by a user or can start automatically
What condition indicates that the activity is complete
Whether control can exit from the activity automatically or the activity must first be confirmed as complete by a user
How much time is allowed for completion of the activity
Who is responsible for completing the activity Which program or process is used to complete the activity
What data is required as input to the activity and as output from it A FlowMark process model consists of the following types of activities:

Program activity: Has a program assigned to perform it. The program is invoked when the activity is started. In a fully automated workflow, the program performs the activity without human intervention. otherwise, the user must start the activity by selecting it from a runtime work list. Output from the program can be used in the exit condition for the program activity and for the transition conditions to other activities.

Process activity: Has a (sub)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity need to be allowed to become interrupted. Thus, termination of an activity does not necessarily indicate that the associated task has been finished successfully. In order to allow the measurement of successfulness of the work performed by an activity a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people as work items. If a user selects the work item, i.e. the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

As already indicated above WFMSs support the definition and execution of business processes. Those business processes are made up of a set of activities which are handled by different people at different places; business processes are therefore processed in most cases in a distributed environment comprising a network of a multitude of computer systems. The activities are generally implemented via programs that the user interacts with and that manage data that is associated with the process. A user typically interacts with the workflow management system via a graphical end user that represents the tasks to be performed by the user as icons. Work for a particular task is started by the user by double-clicking on the appropriate icon which in turn starts the program implementing the activity.

Figure 2:
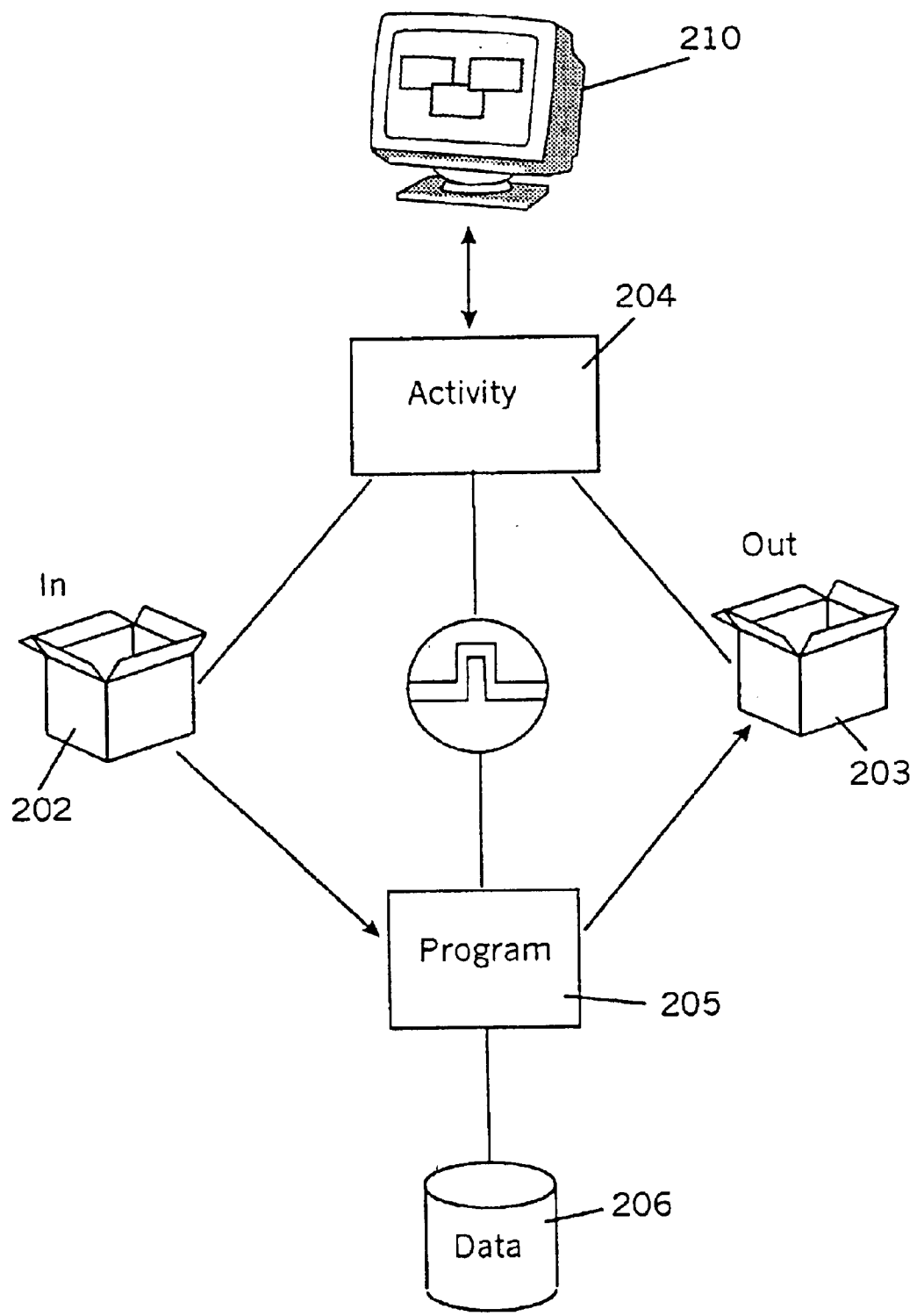
FIG. 2 is an introductory diagram reflecting the second phase of the execution of an activity in a WFMS showing the execution of an activity implementation and it's access to resource/objects by the activity implementation according to prior art technique.

The execution of an activity within a process is performed in two phases visualized in FIG. 1 and FIG. 2. FIG. 1 shows the first phase in which staff resolution is performed. When a process is defined, each activity is assigned an expression (staff assignment) that describes who should perform the activity. The staff assignment is expressed as a query against the organizational database that is part of the workflow management system. When the workflow management system navigates to an activity, it uses that query to find the people who should perform the activity (staff resolution). A work item 101, 102, 103 is created for each of the selected persons. Depending on some settings, the work item is pushed immediately onto the work list 104, 105 of a selected person, or will be made part of the user's work list as the result of an explicit request.

FIG. 2 shows the flow of control when the user starts a work item from the work list representing the second phase of execution of an activity. After double-clicking the work-item representing the execution request of the activity on the work list 201, the workflow management system materializes the input container 202 and/or output container 203 and activates the program 205 that implements the activity 204. The program that is executed typically determines it's context by obtaining some or all of the fields in the input container, interacts with the user, retrieves or modifies some resources/objects 206, or date data for short, modifies the context by storing this information in the output container, and then terminates. This constitutes the completion of the activity, and navigation through the process graph continues.

Considering now aspects closer to the focus of the present invention, workflow management, as for example implemented by IBM FlowMark can be regarded as involving three dimensions.

The first dimension, the process logic dimension describes the actions to be performed, by whom they have to be performed, with which program they have to be performed, and in which sequence they have to be performed.

The second dimension describes the organizational structure, the people and the roles the people are playing.

The third dimension describes the IT infrastructure, such as the workflow servers, and the workstations/programs used by the users.

The actual execution of a workflow is then a series of points in the three-dimensional workflow space. Each point represents the execution of an activity by one person at one computer using a particular program.

Each user that participates in such a workflow is assigned to a WFMS. This WFMS handles all interactions with the user. As such, it is also responsible for managing the processing of an activity that needs to be performed by the user. It has its own database that contains all execution relevant information to support the execution of a workflow. It should be noted that WFMSs that share the same physical database are not considered different WFMS in the wording of the application of the present invention.

When two WFMSs share the execution of a workflow, then each WFMS processes certain activities in the workflow. Which activities are executed at all, depends on the context in which the workflow is executed. In the case of IBM FlowMark, for example, it depends on the values of fields in the input and output container of the process model or the individual activities and their usage in transition conditions associated with control connectors.

Which of the WFMSs is responsible for processing a particular activity depends on the user which is assigned to the particular activity. The user is usually selected by performing staff resolution. During staff resolution each activity in the process is assigned to one or more staff members defined in the FlowMark database. Whether an activity is started manually by the user or automatically by the FlowMark work flow manager, and whether it requires user interaction to complete or completes automatically, a staff member must be assigned to it. For each person defined, a level, and a organization and multiple roles can be specified. These attributes can be used at run time of the WFMS to dynamically assign activities to people with suitable attributes.

This joint execution of a workflow by multiple WFMSs is typical for workflows that are executing within one company. It requires that all participating WFMSs have the same information, such as the underlying workflow model, the organizational information, and the programs to be executed.

This is usually achieved by replicating the appropriate information from a WFMS designated as the primary system to the other WFMSs.

Conceptually all participating WFMSs make up a single WFMS. In most cases, the different WFMSs are just different instances of the same WFMS. To have multiple instances of a single WFMS is usually mandated by the distributed nature of the computing resources.

The processing of different activities within a workflow by different WFMSs requires interactions between the involved WFMSs. The required interactions can be implemented in a large variety of different interaction protocols.

The exemplary arrangement and relationships between the WFMSs described herein is for illustration only; actual implementations could be far more sophisticated.

Figure 3:
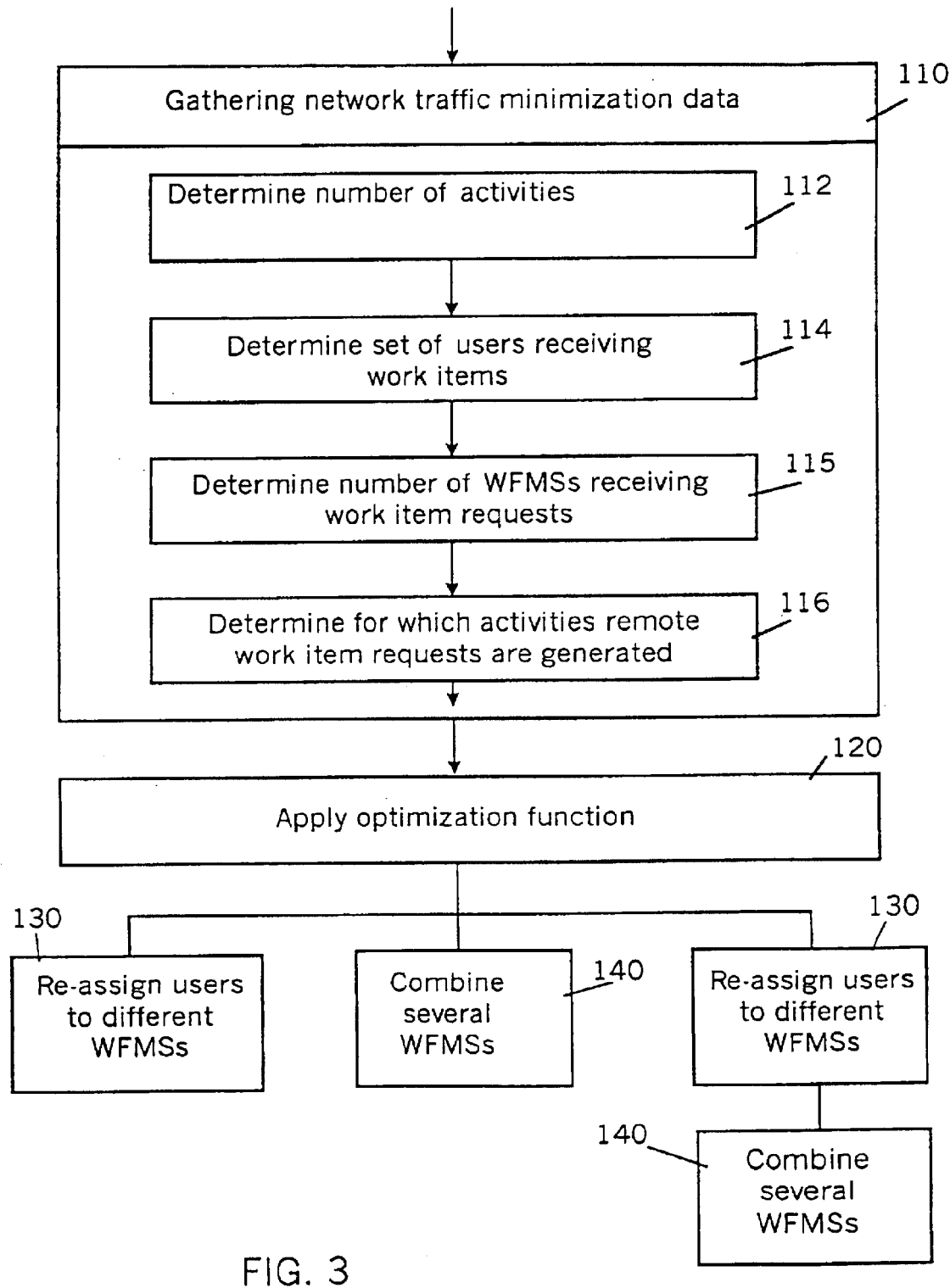
FIG. 3 is a block diagram showing the essential steps of a preferred embodiment of the method according to the present invention.
Figure 4:
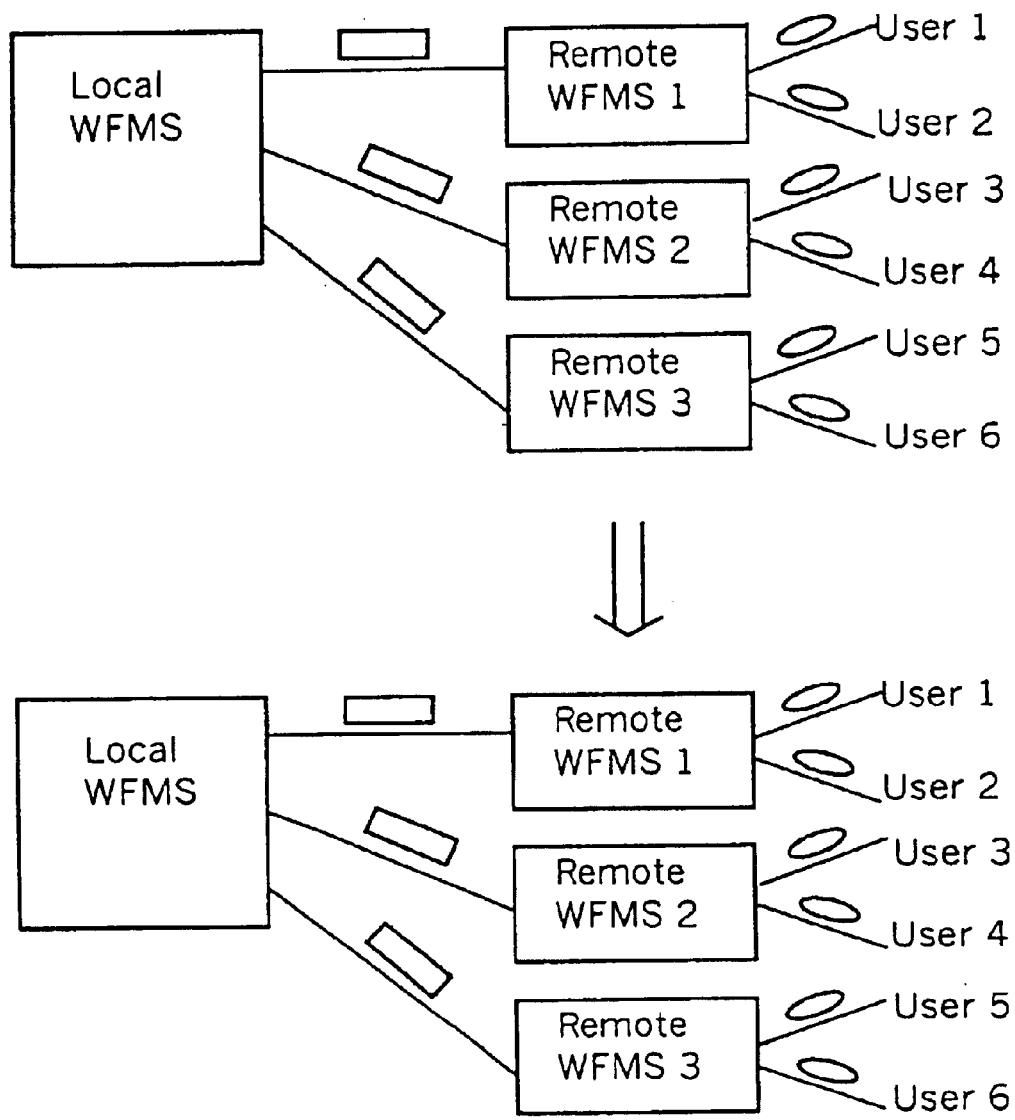
FIG. 4 is a schematic sketch of the associations between local WFMS and a plurality of remote WFMSs each having associated users, in the upper part of the drawing before applying the inventional method, in the bottom part after applying the inventional method.

With general reference to the figures and with special reference now to FIGS. 3, and 4 a preferred embodiment of the method according to the present invention is described.

In a first block 110 request shipping optimization data for the business process is gathered. Generally, all relevant statistical data concerning activities, including probabilities, e.g. that a particular branch is taken in the workflow, is collected. Further, non-statistical data relating to hardware costs, bandwidth costs, maintenance costs as mentioned above are collected.

In particular, the number of activities that are executed for the involved process are determined in a step 112.

Figure 5:
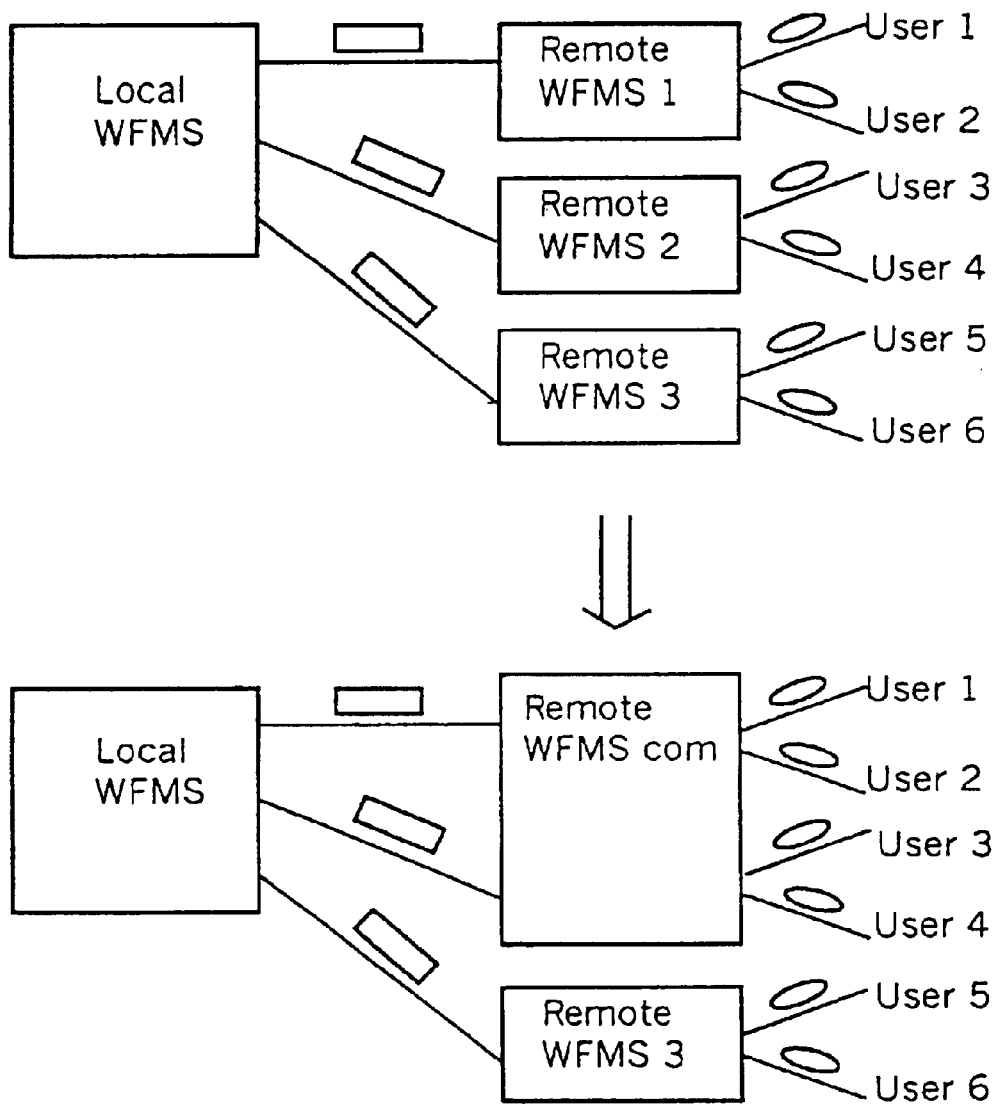
FIG. 5 is a schematic sketch according to FIG. 4 showing the feature of combining WFMSs in a further preferred embodiment of the present invention.

In a further step 113 performing staff resolution for each of the activities yields the set of users that will receive work items during the execution of the process. In FIG. 4 (and in FIG. 5, referred to later) the work items are depicted as oval symbols. In FIGS. 4 and 5 a 'snapshot' of one activity with the associated request shipping processes is depicted.

In a next step 114 for each of the users 1 to 6 the associated WFMS is determined. Here, for users 1 and 2 WFMS 1, for users 3 and 4 WFMS 2 and for users 5, 6 WFMS 3 is determined.

Next, in a step 115 the number of remote work item requests is determined, and further, for which activities they are required. Said remote work item requests are depicted as small rectangles in the drawings.

Then, an optimization function is applied in a step 120. Said function is particular for each enterprise and covers all facts relevant to the quality of service. Any of the data and parameter mentioned in the summarizing chapter above can be taken into consideration as well as others, which are not explicitly mentioned. Then, all data are weighted for specifying their individual relevance in relation to the overall optimization result which is to be drawn from the function. Alternatively, an already existing optimization function can be applied.

According to the invention, said function is calculated yielding a cost minimum of the optimization function with a respective possibly new user distribution across the WFMSs in the system. This is depicted in the bottom part of FIG. 4, where user 1 and user 4 are assigned to remote WFMS 1, users 2 and 3 to remote WFMS 2 and users 5 and 6 remain assigned to remote WFMS 3. Thus, users are re-assigned in a step 130 to their respective WFMS according to the optimum result as it is depicted in the bottom left branch in FIG. 3.

With reference now to FIG. 5 and to FIG. 3, a further preferred embodiment of the inventional method is described, in which a restriction is lifted compared to the basic optimization function described above by which the optimization function is allowed to combine in a step 140 several work flow management systems to one work flow management system. This can happen after—see the bottom right branch of FIG. 3—or before the steps described above were/are performed. As is depicted in FIG. 5, as a corresponding optimization result users 1 to 4 are associated to the resulting combined WFMScom, and users 5 and 6 remain as they were before.

Thus, the number of different WFMSs is reduced what automatically minimizes shipping of remote work item requests Finally, step 140 of combining several WFMSs to one WFMS can be performed even without the step of re-assigning users. This is depicted in the bottom center branch in FIG. 3 for a situation in which the optimization function was already applied. Nevertheless, step 140 can be applied too, without passing through block 110 and step 120 from FIG. 3.

In general, for gathering the optimization data as elements of the optimization function as described in block 110 several alternatives are possible.

Analytical and discrete simulation can be used for determining the number of activities that are executed for each of the involved processes. It should be noted that the numbers that are involved into the simulation, such as probabilities that a certain branch is taken in the process, can be verified later through analysis of the audit trail.

The audit trail of the local WFMS can be taken as well as data source because all relevant statistical data are available from it, when the observation time is long enough.

The method described above can be implemented advantageously in a workflow optimization tool which can be applied to already existing distributed applications. Even a kind of user exit which is programmed as a supplement of any of the involved activities can be taken for generating the optimization data, too. As well, the method can be applied while developing the business model for a future application. Then the input data are created by simulation.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method, in a workflow management system (WFMS), for optimizing sending of WFMS activity execution requests within a plurality of distributed networked computer systems,
    said WFMS comprising an owning WFMS administrating execution of a business process by interpretation of a corresponding WFMS process model,
    said WFMS process model comprising a plurality of WFMS activities,
    said WFMS process model defining potential control flow within said WFMS process model,
    wherein said WFMS process model separates processing of said potential control flow by said WFMS from implementation of said WFMS activities,
    said owning WFMS being responsive to its decision to pass control to a next WFMS activity by performing steps of,
    determining a multitude of users allowed to potentially perform said next WFMS activity,
    determining a multitude of remote WFMS administrating execution of said next WFMS activity by said users,
    sending WFMS activity execution requests for said next WFMS activity to said remote WFMS to trigger said remote WFMS to include WFMS work items in work lists of said users, said WFMS work item, when selected by a particular one of said users, starting execution of said next WFMS activity,
    said WFMS performing steps of,
    gathering (110) optimization data influencing costs of said sending WFMS activity execution requests,
    the step of gathering (110) optimization data comprising,
    determining (112) the number of WFMS activities being executed for said business process,
    determining (113) the set of users receiving WFMS activity execution requests during execution of said business process,
    determining (114) the number of remote WFMS receiving remote WFMS activity execution requests,
    determining (115) for which activities remote WFMS activity execution requests are generated
    applying (120) an overall optimization function including said optimization data, and
    re-assigning (130) users to a differentWFMS, such that said costs are optimized.

2. A method, in a workflow management system (WFMS), for optimizing sending of WFMS activity execution requests within a plurality of distributed networked computer systems,
    said WFMS comprising an owning WFMS administrating execution of a business process by interpretation of a corresponding WFMS process model,
    said WFMS process model comprising a plurality of WFMS activities,
    said WFMS process model defining potential control flow within said WFMS process model,
    wherein said WFMS process model separates processing of said potential control flow by said WFMS from implementation of said WFMS activities,
    said owning WFMS being responsive to its decision to pass control to a next WFMS activity by performing steps of,
    determining a multitude of users allowed to potentially perform said next WFMS activity,
    determining a multitude of remote WFMS administrating execution of said next WFMS activity by said users,
    sending WFMS activity execution requests for said next WFMS activity to said remote WFMS to trigger said remote WFMS to include WFMS work items in work lists of said users, said WFMS work item, when selected by a particular one of said users, starting execution of said next WFMS activity,
    said WFMS performing steps of, gathering (110) optimization data influencing costs of said sending WFMS activity execution requests, the step of gathering (110) optimization data comprising, using analytical and/or discrete simulation to determine optimization data applying (120) an overall optimization function including said optimization data, and re-assigning (130) users to a differentWFMS, such that said costs are optimized.

3. A method, in a workflow management system (WFMS), for optimizing sending of WFMS activity execution requests within a plurality of distributed networked computer systems, said WFMS comprising an owning WFMS administrating execution of a business process by interpretation of a corresponding WFMS process model, said WFMS process model comprising a plurality of WFMS activities, said WFMS process model defining potential control flow within said WFMS process model, wherein said WFMS process model separates processing of said potential control flow by said WFMS from implementation of said WFMS activities, said owning WFMS being responsive to its decision to pass control to a next WFMS activity by performing steps of, determining a multitude of users allowed to potentially perform said next WFMS activity, determining a multitude of remote WFMS administrating execution of said next WFMS activity by said users, sending WFMS activity execution requests for said next WFMS activity to said remote WFMS to trigger said remote WFMS to include WFMS work items in work lists of said users, said WFMS work item, when selected by a particular one of said users, starting execution of said next WFMS activity, said WFMS performing steps of, gathering (110) optimization data influencing costs of said sending WFMS activity execution requests, the step of gathering (110) optimization data comprising, using audit trail information to determine optimization data applying (120) an overall optimization function including said optimization data, and re-assigning (130) users to a differentWFMS, such that said costs are optimized.

4. A method, in a workflow management system (WFMS), for optimizing sending of WFMS activity execution requests within a plurality of distributed networked computer systems, said WFMS comprising an owning WFMS administrating execution of a business process by interpretation of a corresponding WFMS process model, said WFMS process model comprising a plurality of WFMS activities, said WFMS process model defining potential control flow within said WFMS process model, wherein said WFMS process model separates processing of said potential control flow by said WFMS from implementation of said WFMS activities, said owning WFMS being responsive to its decision to pass control to a next WFMS activity by performing steps of, determining a multitude of users allowed to potentially perform said next WFMS activity, determining a multitude of remote WFMS administrating execution of said next WFMS activity by said users, sending WFMS activity execution requests for said next WFMS activity to said remote WFMS to trigger said remote WFMS to include WFMS work items in work lists of said users, said WFMS work item, when selected by a particular one of said users, starting execution of said next WFMS activity, said WFMS performing steps of, gathering (110) optimization data influencing costs of said sending WFMS activity execution requests, applying (120) an overall optimization function including said optimization data, and re-assigning (130) users to a differentWFMS, such that said costs are optimized, reducing the number of WFMS by combining different WFMS.

5. A computer program product stored on computer usable medium, comprising computer readable program means for causing a computer to perform a method, in a workflow management system (WFMS), for optimizing sending of WFMS activity execution requests within a plurality of distributed networked computer systems, said WFMS comprising an owning WFMS administrating execution of a business process by interpretation of a corresponding WFMS process model, said WFMS process model comprising a plurality of WFMS activities, said WFMS process model defining potential control flow within said WFMS process model, wherein said WFMS process model separates processing of said potential control flow by said WFMS from implementation of said WFMS activities, said owning WFMS being responsive to its decision to pass control to a next WFMS activity by performing steps of, determining a multitude of users allowed to potentially perform said next WFMS activity determining a multitude of remote WFMS administrating execution of said next WFMS activity by said users, sending WFMS activity execution requests for said next WFMS activity to said remote WFMS to truer said remote WFMS to include WFMS work items in work lists of said users said WFMS work item when selected by a particular one of said users starting execution of said next WFMS activity, said WFMS performing steps of, gathering (110) optimization data influencing costs of said sending WFMS activity execution requests, the step of gathering (110) optimization data comprising, determining (112) the number of WFMS activities being executed for said business process, determining (113) the set of users receiving WFMS activity execution requests during execution of said business process, determining (114) the number of remote WFMS receiving remote WFMS activity execution requests, determining (115) for which activities remote WFMS activity execution requests are generated, applying 120) an overall optimization function including said optimization data, and re-assigning (130) users to a different WFMS such that said costs are optimized.

6. A computer program product stored on computer usable medium, comprising computer readable program means for causing a computer to perform a method in a workflow management system (WFMS), for optimizing sending of WFMS activity execution requests within a plurality of distributed networked computer systems, said WFMS comprising an owning WFMS administrating execution of a business process by interpretation of a corresponding WFMS process model said WFMS process model comprising a plurality of WFMS activities said WFMS process model defining potential control flow within said WFMS process model, wherein said WFMS process model separates processing of said potential control flow by said WFMS from implementation of said WFMS activities, said owning WFMS being responsive to its decision to pass control to a next WFMS activity by performing steps of, determining a multitude of users allowed to potentially perform said next WFMS activity, determining a multitude of remote WFMS administrating execution of said next WFMS activity by said users, sending WFMS activity execution requests for said next WFMS activity to said remote WFMS to trigger said remote WFMS to include WFMS work items in work lists of said users said WFMS work item when selected by a particular one of said users, starting execution of said next WFMS activity, said WFMS performing steps of, gathering (110) optimization data influencing costs of said sending WFMS activity execution requests, the step of gathering (110) optimization data comprising, using audit trail information to determine optimization data, applying (120) an overall optimization function including said optimization data, and re-assigning (130) users to a different WFMS such that said costs are optimized.

* * * * *

UNITED STATES PATENT AND TRADEMARK OFFICE
CERTIFICATE OF CORRECTION

PATENT NO. : 6,832,201 B1
DATED : December 14, 2004
INVENTOR(S) : Frank Leymann et al.

It is certified that error appears in the above-identified patent and that said Letters Patent is hereby corrected as shown below:

Title page,
Item [56], References Cited, OTHER PUBLICATIONS, "Project Management Environment", by D.J. Spohn, IBM Technical Disclosure Bulletin, vol. 32, No. 9A, Feb 1999, pp. 250-254." should be -- Project Management Environment", by D.J. Spohn, IBM Technical Disclosure Bulletin, vol. 32, No. 9A, Feb 1990, pp. 250-254. --

Column 3,
Lines 41 and 42, "later with reference to
            Fig. 2. The results that are"
should be -- later with reference to Fig. 2.
        The results that are --

Column 8,
Line 37, "(sub)process" should be -- (sub-)process --

Column 16,
Line 66, "applying 120) an overall" should be -- applying (120) an overall --

Signed and Sealed this

Twenty-first Day of June, 2005

JON W. DUDAS
*Director of the United States Patent and Trademark Office*